United States Patent [19]

Takizawa et al.

[11] Patent Number: 5,311,497
[45] Date of Patent: May 10, 1994

[54] PICKUP FEEDING APPARATUS FOR A DOUBLE-SIDED REPRODUCING DISC PLAYER

[75] Inventors: Kazuyuki Takizawa, Chiba; Hideki Okii; Minoru Otsuka, both of Tokyo, all of Japan

[73] Assignee: Sony Corporation, Tokyo, Japan

[21] Appl. No.: 949,569

[22] Filed: Sep. 23, 1992

[30] Foreign Application Priority Data

Sep. 30, 1991 [JP] Japan .................................. 3-278733
Sep. 30, 1991 [JP] Japan .................................. 3-278734
Sep. 30, 1991 [JP] Japan .................................. 3-278735
Sep. 30, 1991 [JP] Japan .................................. 3-278736

[51] Int. Cl.$^5$ ...................... G11B 17/30; G11B 21/02
[52] U.S. Cl. ............................... 369/219; 369/195; 369/199; 369/244
[58] Field of Search .............. 369/199, 215, 219, 195, 369/244

[56] References Cited

U.S. PATENT DOCUMENTS

| | | | |
|---|---|---|---|
| 4,097,465 | 3/1992 | Funabashi et al. | 369/199 |
| 4,829,508 | 5/1989 | Arita | 369/215 |
| 5,036,507 | 7/1991 | Yamashita | 369/215 X |
| 5,081,618 | 1/1992 | Abe | 369/199 X |
| 5,105,418 | 4/1992 | Kenmotsu et al. | 369/199 X |
| 5,172,370 | 12/1992 | Suzuki | 369/199 X |
| 5,208,798 | 5/1993 | Funabashi et al. | 369/199 X |

FOREIGN PATENT DOCUMENTS

0314394A3  5/1989  European Pat. Off. .

OTHER PUBLICATIONS

Patent Abstracts of Japan, vol. 7, No. 15 (P-169)(1160), Jan. 21, 1983 & JP-A-57 169 936 (Ricoh K.K.).
Patent Abstracts of Japan, vol. 7, No. 6 (P-167), Jan. 11, 1983 & JP-A-57 164 451 (Ricoh K.K.), Oct. 9, 1982.

*Primary Examiner*—Edward K. Look
*Assistant Examiner*—John Ryznic
*Attorney, Agent, or Firm*—Philip M. Shaw, Jr.

[57] ABSTRACT

An optical pickup can be inverted accurately and smoothly regardless of the skew operation of the optical pickup. The present invention is directed to a disc player in which a single optical pickup (37) is inverted in an opposing relation to both surfaces of a disc (D) at the same time when it is elevated so that both surfaces of the disc (D) can be reproduced. As an inverting mechanism (79) of the optical pickup (37), an inverting gear (80) is attached to a supporting shaft (53) on which the optical pickup (37) is supported. On the other hand, an inverting rack (81) which is meshed with the inverting gear (80) so as to invert the optical pickup (37) is attached through a supporting frame (82) to a lower chassis (4) which is skewed.

19 Claims, 8 Drawing Sheets

PICKUP FEEDING APPARATUS FOR A DOUBLE-SIDED REPRODUCING DISC PLAYER

BACKGROUND OF THE INVENTION

1. Field of the Invention

The present invention generally relates to disc players for a laser disc or the like and, more particularly, to a pickup feeding apparatus for a double-sided reproducing disc player.

2. Description of the Related Art

There is widely utilized an optical disc player which plays back a video signal or the like by using an optical disc such as a laser disc or the like as a recording medium. In this kind of disc player, an optical pickup device is generally opposed to a disc that is rotated at high speed by a spindle motor, and this optical pickup device is translated in the diametrical direction of the disc, whereby a signal recorded on the recording track of the disc is read out and then reproduced.

While a digital signal is generally recorded on both surfaces of the disc that is used by such disc player, the disc player includes a single optical pickup device that is opposed to only one side surface of the disc. Accordingly, as a method for reproducing both surfaces of the disc by using a single optical pickup head, it is proposed that, after one side surface of the disc, for example, is played back, the disc is once ejected from the disc player, turned over and then again loaded onto the disc player so that the other side surface of the disc is reproduced. Recently, a so-called double-sided reproducing disc player is proposed, in which, after the playback of one side of the disc is finished, the optical pickup device is inverted and moved to the opposite side surface of the disc so as to reproduce the other side surface of the disc (see Japanese Laid-Open Patent Publication No. 2-66744 (corresponding to U.S. Pat. No. 5,097,465).

However, in the above conventional optical disc player which plays both side surfaces of the optical disc, such a double-sided disc player is not yet proposed, in which a transporting shaft (guide shaft) of an optical pickup is rotatably adjusted and the optical pickup is skewed in order to adjust the optical axis of a so-called optical pickup in accordance with the flexure of the disc to be perpendicular to the disc surface. For this reason, in the prior art, the skew adjustment mechanism based on the transport shaft of the optical pickup is disposed within a pickup supporting member on which the optical pickup is mounted.

Therefore, in the optical disc player for playing the double-sided disc, a weight of the pickup supporting member is increased so that the optical pickup cannot be moved smoothly and that the mechanism of the pickup supporting member becomes complicated. Further, when the guide shafts disposed on the upper and lower surface sides of the disc are respectively movably adjusted, the following problems arise. That is, when the optical pickup is inverted after one side surface of the disc is played by the optical pickup, or the optical pickup is moved to the inverting mechanism side, depending on the skew operation position of the optical pickup, a positional displacement occurs between the guide shaft and the inverting mechanism so that the optical pickup cannot be accurately and smoothly moved. As a result, the optical pickup cannot be inverted or the attitude of the inverted optical pickup cannot be brought in the correct one.

In addition, in the optical disc player for playing the double-sided disc, the inverting mechanism is rotatably moved in an arc fashion so that the inverting operation distance of the optical pickup is increased, which needs a lot of time for the optical pickup to move from one side surface to the other side surface of the disc.

OBJECTS AND SUMMARY OF THE INVENTION

Accordingly, it is an object of the present invention to provide an improved pickup feeding apparatus for a double-sided reproducing disc player in which the aforesaid shortcomings and disadvantages encountered with the prior art can be eliminated.

More specifically, it is an object of the present invention to provide a pickup feeding apparatus for a double-sided reproducing disc player in which an optical pickup can be accurately and smoothly moved between a guide shaft serving as a transporting shaft of the optical pickup and a pickup inverting mechanism regardless of the skew operation of the optical pickup.

Another object of the present invention is to provide a pickup feeding apparatus for a double-sided disc reproducing disc player in which an optical pickup can be accurately and smoothly inverted regardless of the skew operation of the optical pickup.

According to a first aspect of the present invention, there is provided a pickup feeding apparatus for a double-sided reproducing disc player in which a single optical pickup is moved so as to oppose both recording surfaces of a disc on which signals are recorded and reproduces both recording surfaces of the disc loaded onto a turntable. This pickup device feeding apparatus comprises an upper chassis and a lower chassis facing to both recording surfaces of the disc and which are disposed in substantially parallel to a disc surface, a rear chassis for coupling the upper and lower chassis, a carriage meshed with first and second racks which are disposed on the upper and lower chassis so as to extend over inner and outer peripheries of the disc, the carriage being transported in the diametrical direction of the disc, an optical pickup supported on the carriage so that it can be inverted about a shaft disposed in the direction perpendicular to the direction in which the carriage is moved, the optical pickup being moved along first and second guide shafts respectively disposed on the upper and lower chassis in parallel to the first and second racks, a tilt mechanism for adjusting a tilt of the upper and lower chassis in a ganged relation so that the optical pickup is skewed, a pickup elevating mechanism for linearly elevating the carriage together with the optical pickup between the upper and lower chassis along the rear chassis, and an inverting mechanism for inverting the optical pickup while the carriage is being elevated, wherein the inverting mechanism comprises an inverting gear attached to a supporting shaft on which the optical pickup is supported so as to be inverted, the inverting gear being unitarily rotated with the optical pickup and an inverting rack attached to at least one of the upper and lower chassis skewed by the tilt mechanism, the inverting rack being meshed with the inverting gear to thereby invert the optical pickup.

According to a second aspect of the present invention, there is provided a pickup feeding apparatus for a double-sided reproducing disc player in which a single optical pickup is moved so as to oppose both recording surfaces of a disc on which signals are recorded and reproduces both recording surfaces of the disc loaded onto a turntable. This pickup feeding apparatus comprises an upper chassis and a lower chassis facing to the both recording surfaces of the disc and which are disposed in substantially parallel to a disc surface, a rear chassis for coupling the upper and lower chassis, a carriage meshed with first and second racks which are disposed on the upper and lower chassis so as to extend over inner and outer peripheries of the disc, the carriage being transported in the diametrical direction of the disc, an optical pickup supported on the carriage so that it can be inverted about a shaft disposed in the direction perpendicular to the direction in which the carriage is moved, the optical pickup being moved along first and second guide shafts respectively disposed on the upper and lower chassis in parallel to the first and second racks, a tilt mechanism for adjusting a tilt of the upper and lower chassis in a ganged relation so that the optical pickup is skewed, a pickup elevating mechanism for linearly elevating the carriage together with the optical pickup between the upper and lower chassis along the rear chassis, and an inverting mechanism for inverting the optical pickup while the carriage is being elevated, wherein the pickup elevating mechanism includes an elevating member having an engagement member for holding the optical pickup and an elevation motor for elevating the elevating member, the elevating member being coupled through the rear chassis to at least one upper and lower chassis skewed by the tilt mechanism.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, wherein.

DETAILED DESCRIPTION OF THE PREFERRED EMBODIMENT

A pickup feeding apparatus according to an embodiment of the present invention will now be described with reference to the drawings.

Figure 1:
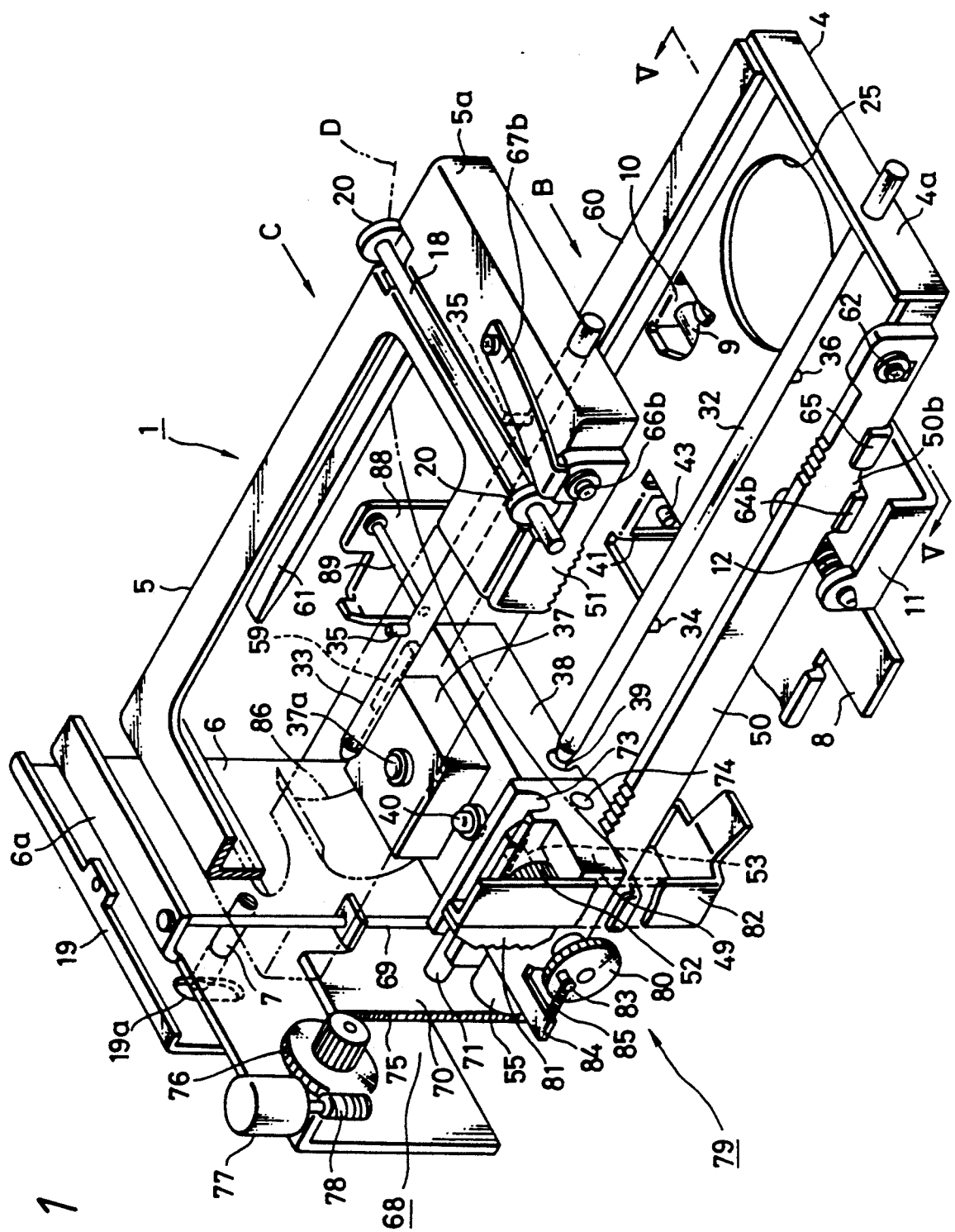
FIG. 1 is a perspective view showing an overall arrangement of a pickup feeding mechanism according to an embodiment of the present invention in a fragmentarily cut-away fashion.
Figure 2:
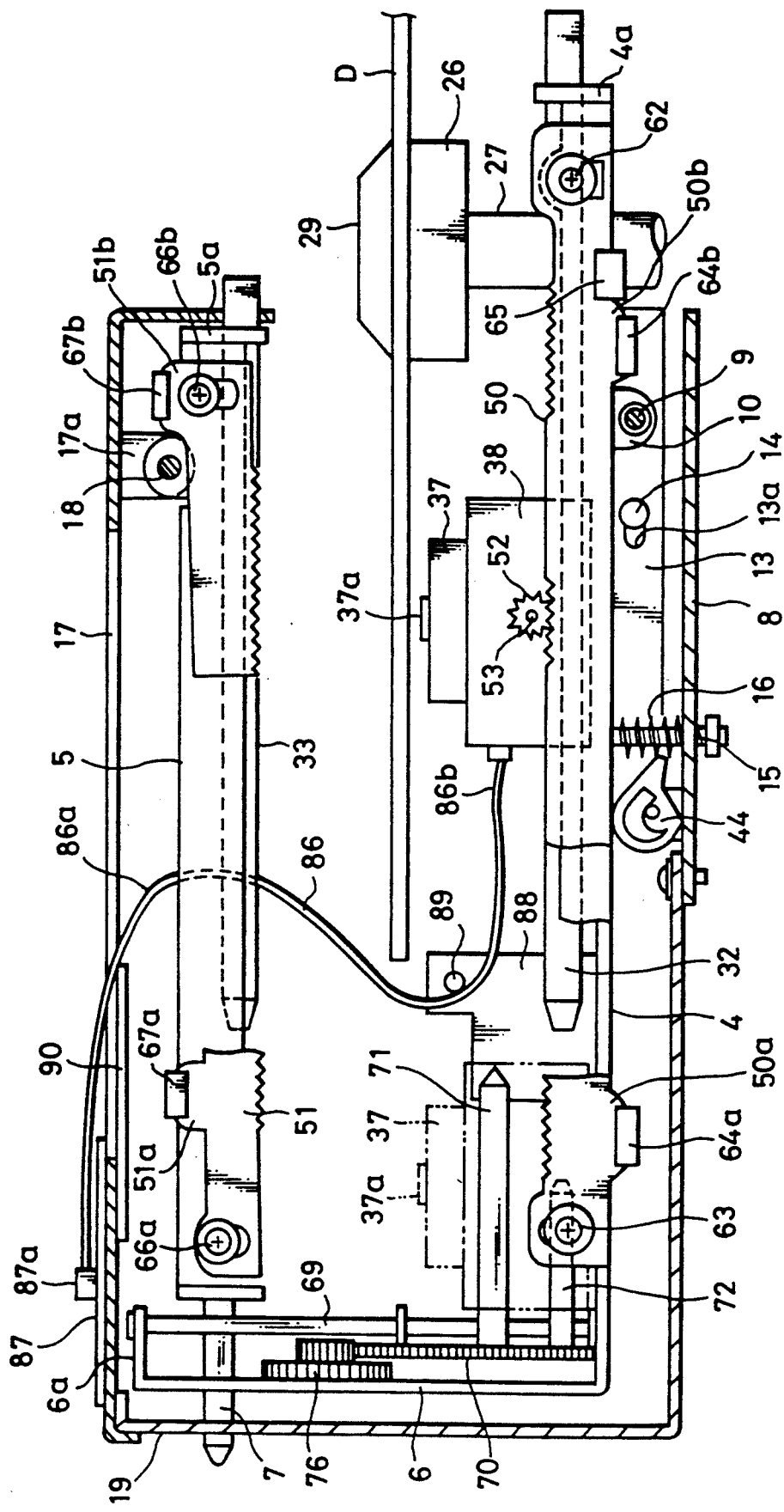
FIG. 2 is a cross-sectional side view of the pickup feeding apparatus according to the present invention.
Figure 3:
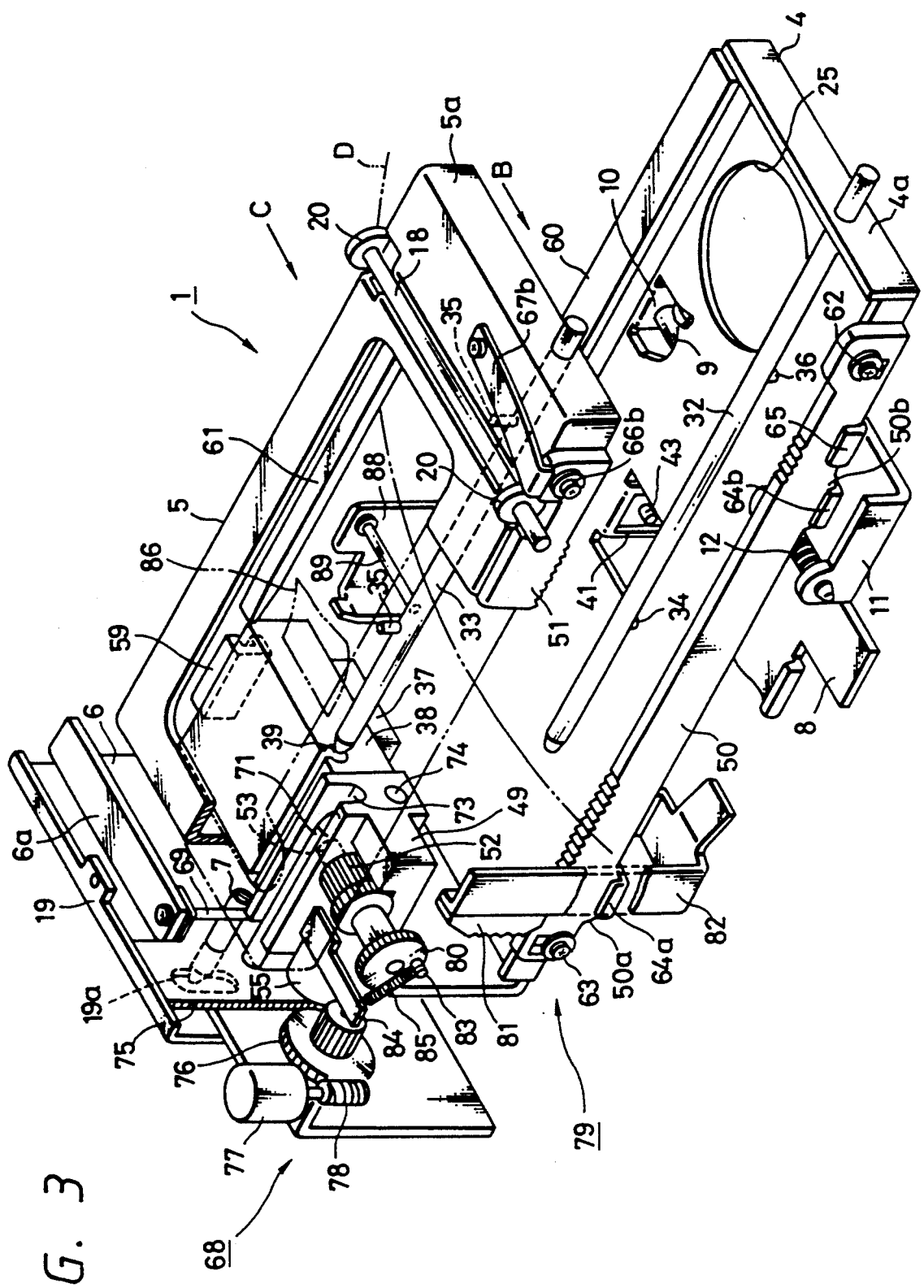
FIG. 3 is a perspective view showing in a fragmentarily cut-away fashion the pickup feeding apparatus according to the present invention under the condition such that the pickup feeding apparatus is inverted.
Figure 4:
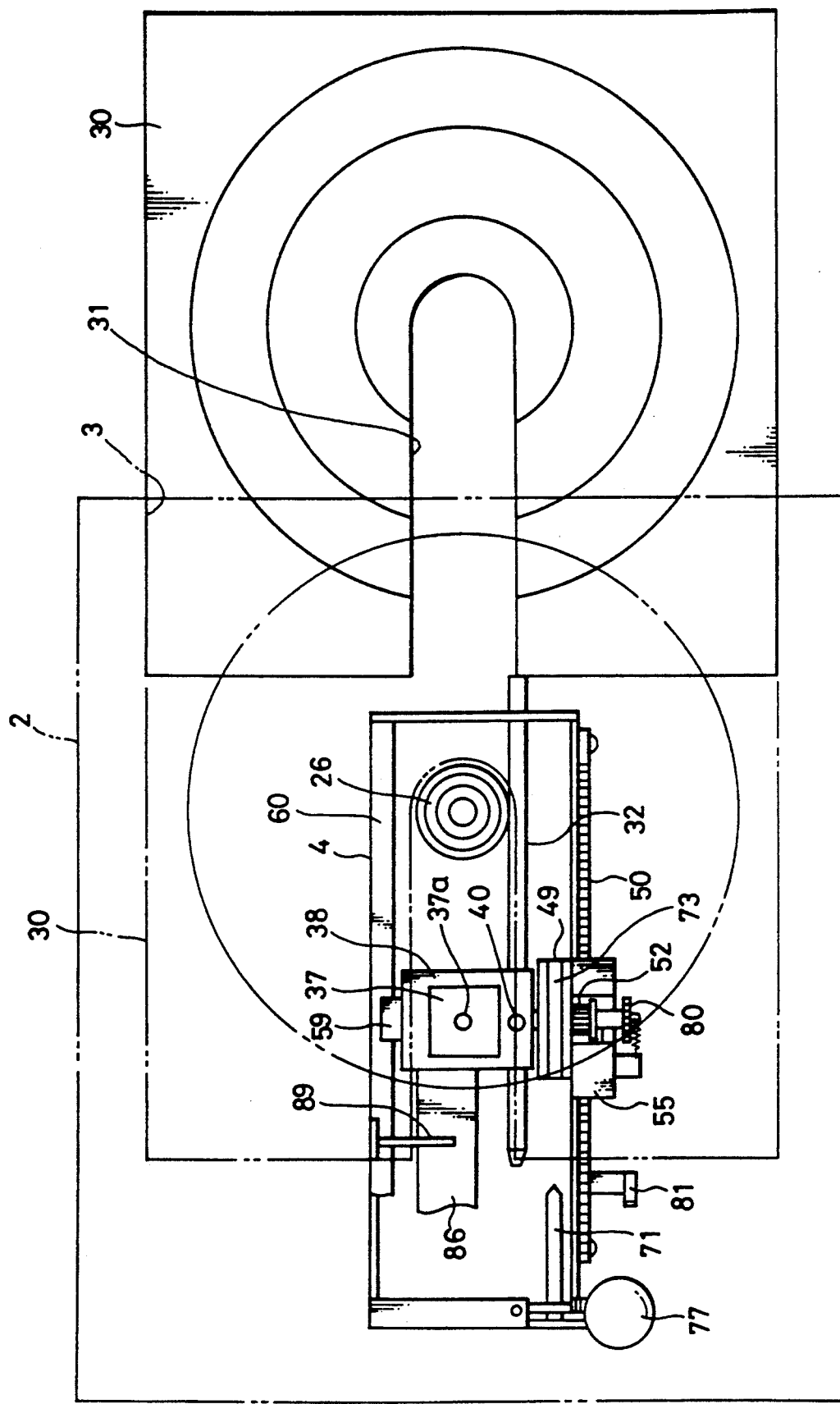
FIG. 4 is a plan view schematically showing an overall arrangement of a disc player.

FIG. 1 of the accompanying drawings is a perspective view showing an overall arrangement of a pickup feeding apparatus according to an embodiment of the present invention in a fragmentarily cut-away fashion, FIG. 2 of the accompanying drawings is a cross-sectional side view of the pickup feeding apparatus according to the present invention, FIG. 3 of the accompanying drawings is a perspective view showing in a fragmentary cut-away fashion the pickup feeding apparatus under the condition such that the pickup is inverted, and FIG. 4 of the accompanying drawings is a schematic plan view showing an overall arrangement of a disc player.

As illustrated, an optical pickup feeding mechanism generally depicted by reference numeral 1 is disposed at the position opposing a disc insertion opening 3 within a disc player housing 2 shown in FIG. 4. In the pickup feeding apparatus 1, lower and upper chassis 4, 5, which are opposed to each other with a predetermined spacing therebetween in the upper and lower direction, and a rear chassis 6, which is located at the rear end of the lower chassis 4, i.e., at the opposite side of the disc insertion opening 3 are disposed in a substantially U-letter configuration. The lower and upper chassis 4, 5 and the rear chassis 6 will hereinafter be described in detail.

As illustrated, for example, in FIG. 2, the rear chassis 6 is integral and vertically erected from the rear end of the lower chassis 4 and a shaft pin 7, which is horizontally projected from the rear end of the upper chassis 5, is engaged into and supported by the upper portion of the rear chassis 6. The lower chassis 4 is swingably supported at its front side portion to a fixed chassis 8 secured to the disc player housing 2 by a support shaft 9 in the vicinity of a disc turntable which will be described later on. This support shaft 9 serves as a supporting shaft that is used to adjust the inclinations of the lower and upper chassis 4 and 5, i.e., to adjust the skew angles.

Figure 5:
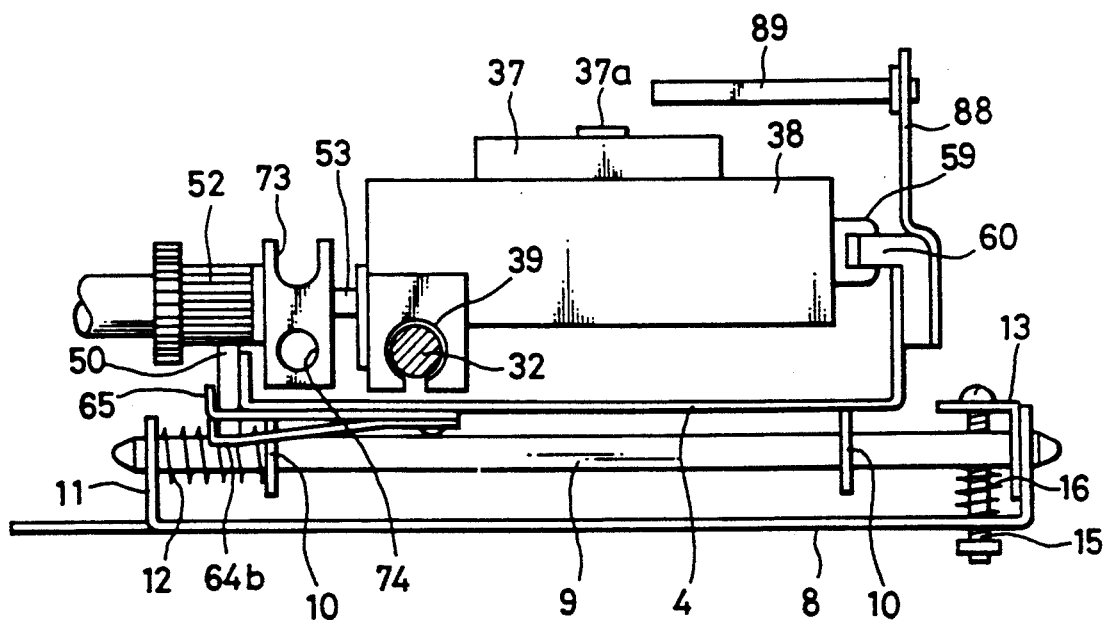
FIG. 5 is a cross-sectional view taken along the line V—V in FIG. 1.
Figure 6:
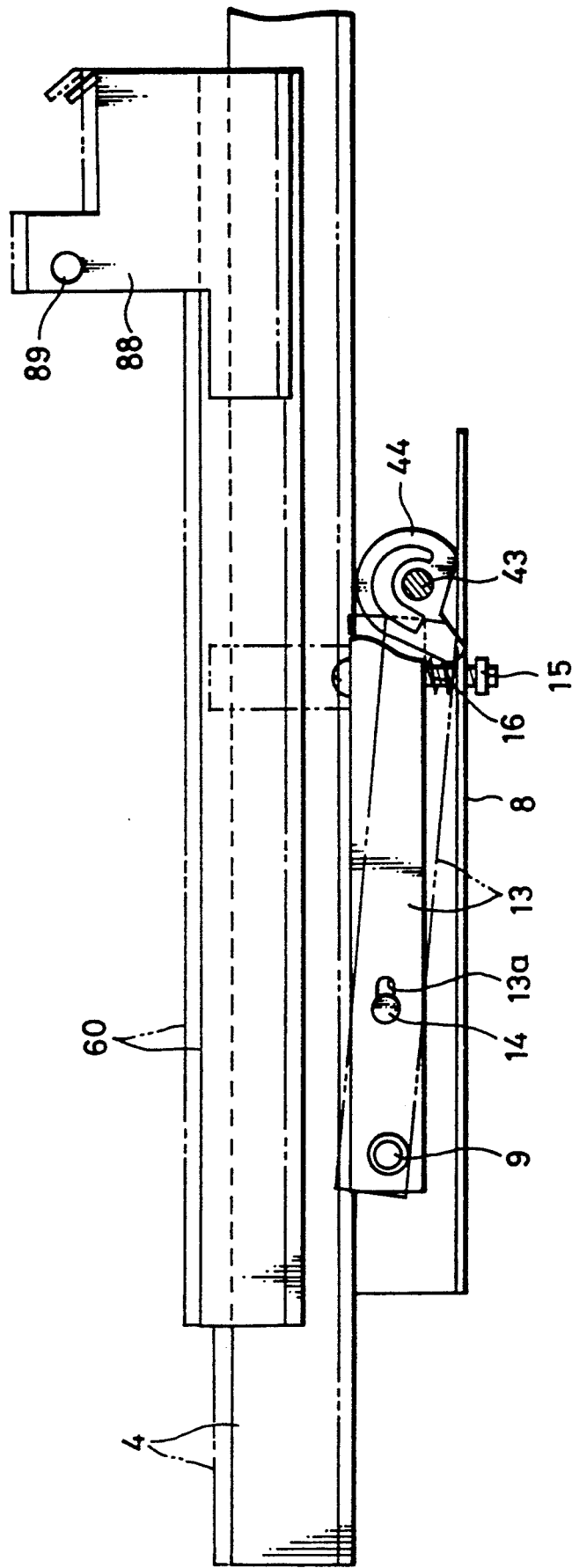
FIG. 6 is a front view of a tangential skew adjusting unit of a lower chassis.

The support shaft 9 is supported by bearing members 10, 10 which are downwardly bent from the lower chassis 4. One end of the support shaft 9 is supported by a bearing plate 11 upwardly bent from the fixed chassis 8 and a coil spring 12 is interposed between the bearing member 10 and the bearing plate 11. The other end of the support shaft 9 is supported to one end of a first movable bearing plate 13 as shown in FIGS. 5 and 6. The movable bearing plate 13 is supported to the fixed chassis 8 by the engagement of the shaft 14 with an aperture 13a formed at the intermediate portion of the movable bearing plate 13. An adjustment screw 15 is inserted into the other end of the first movable bearing plate 13 and a screw portion of the adjustment screw 15 is screwed into the fixed chassis 8. The other end of the first movable bearing plate 13 is upwardly spring-biased by a coil spring 16 coiled about the screw 15 so that, when the adjustment screw 15 is turned by a screw driver (not shown) or the like, the adjustment screw 15 is moved in the upper and lower direction. As a result, the first movable bearing plate 13 is swung about the shaft 14, thereby adjusting the angle of the lower chassis 4 relative to the fixed chassis 8 in the tangential direction of a disc D.

The upper chassis 5 is supported by a support shaft 18 to a base plate 17 the front end portion of which covers the upper chassis 5 from above (as shown in FIG. 2). A rear end portion of the base plate 17 is secured by a screw (not shown) to a fixed support plate 19 which is vertically erected from the fixed chassis 8 behind the rear portion of the rear chassis 6 with a predetermined spacing. A side plate (not shown) of the base plate 17 is secured to the disc player housing 2 by means of screws (not shown). A vertically-elongated slit aperture 19a to which the shaft pin 7 projected from the upper chassis 5 is engaged is formed through the base plate 17. The supporting shaft 18 is supported by bearing members 20, 20 upwardly bent from the upper chassis 5. One end of the support shaft 18 is supported to a bearing plate 17a downwardly bent from the base plate 17 and the other end thereof is supported to one end of a second movable bearing plate 21 as shown in FIG. 7.

Figure 7:
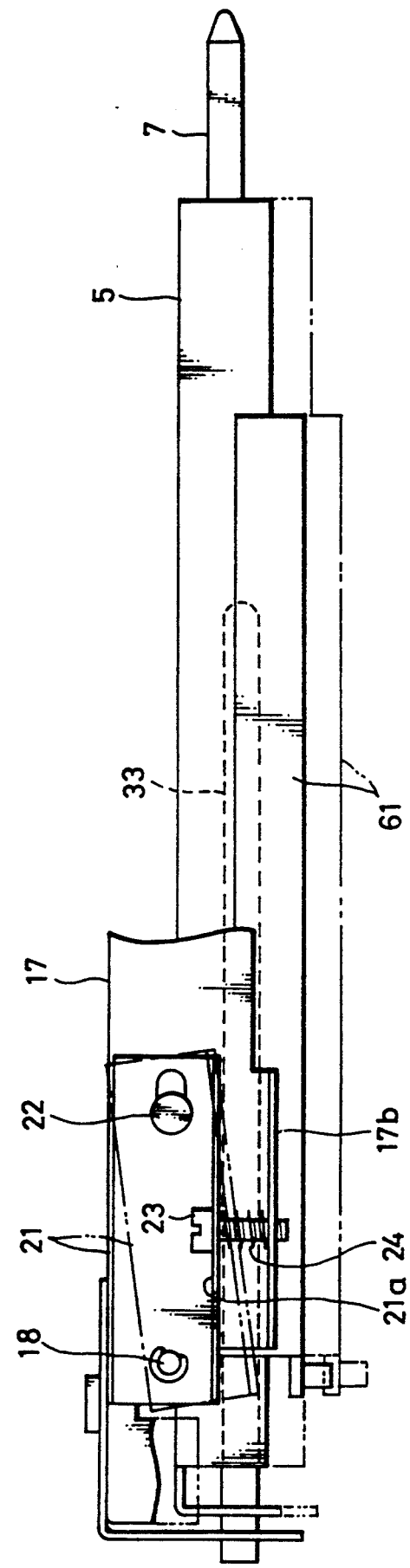
FIG. 7 is a front view of a tangential skew adjusting unit of an upper chassis.

As shown in FIG. 7, the other end of the second movable bearing plate 21 is rotatably supported by a shaft 22 to the base plate 17. An adjustment screw 23 is inserted into a flange 21a formed on the second movable bearing plate 21 and a screw portion of the screw 23 is screwed into a flange 17b formed on the base plate 17. A coil spring 24 is extended between both the flanges 21a and 17b. Thus, when the adjustment screw 23 is rotated by some tools such as a screw driver or the like and moved upwardly or downwardly relative to the base plate 17, the second movable bearing plate 21 is swung about the shaft 22 to thereby adjust the tangential direction of the upper chassis 5 relative to the base plate 17 in the disc D.

The disc D is rotatably disposed within a space between the lower and upper chassis 4 and 5. More specifically, as shown in FIG. 2, a turntable 26 is projected above the lower chassis 4 through an opening portion 25 (FIG. 5) formed through a front end portion of the lower chassis 4 and rotated by a spindle motor (not shown) that is disposed on the lower end of a rotary shaft 27 that rotates the turntable 26. The disc D loaded on the turntable 26 is chucked from above by a chucking device 29 and thereby rotated at high speed. The disc D is loaded onto and ejected from the disc player housing 2 under the condition such that the disc D is loaded onto a disc tray 30 which is freely inserted into and taken out from the disc insertion opening 3 as shown in FIG. 4. The disc tray 30 includes an opening portion 31 which is opened from a portion corresponding to the position of the turntable 26 to its end portion corresponding to the direction in which an optical pickup is moved along the signal recording surface of the disc D as will be described later on.

To the lower and upper chassis 4 and 5, there are respectively supported guide shafts 32 and 33 which guide the transport of the optical pickup in the inner and outer ward directions of the disc D. Both guide shafts 32 and 33 are disposed opposite to each other in the vertical direction, and the guide shaft 33 of the upper chassis 5 is made coaxial with the aforementioned shaft pin 7. One end of the guide shafts 32, 33 are respectively inserted into and secured to receiving plates 4a, 5a erected from the lower and upper chassis 4, 5. The guide shafts 32, 33 are respectively screwed to the lower and upper chassis 4, 5 by means of support members 34, 35. Of the guide shafts 32 and 33, the guide shaft 32 of the lower chassis 4 is screwed to the portion just before the turntable 26 by a guide restricting supporting member 36.

An optical pickup 37 is disposed along the guide shafts 32, 33 of the lower and upper chassis 4, 5 so as to become movable in the inner and outer ward direction of the disc D. The optical pickup 37 is mounted on a pickup support member 38. A guide aperture 39 formed through the pickup support member 38 receives the guide shaft 32 or 33 so that the optical pickup 37 can be slid along the lengths of the guide shafts 32 and 33. When the optical pickup 37 is located on the lower chassis 4 side as shown in FIG. 2, an objective lens 37a and a tilt detection unit 40 attached to the optical pickup 37 are opposed to the lower recording surface of the disc D.

A tilt mechanism that skews the lower and upper chassis 4 and 5 will be described below.

A rotary shaft 43 (FIG. 6) is supported between a bearing plate 41 erected from the lower chassis 4 at substantially the center of the stationary chassis 8 and a side plate (not shown) formed as one body with the stationary chassis 8 at the rear side of the support shaft 9 which swingably supports the lower chassis 4. A cam 44 is secured to the bearing plate 41 side of the rotary shaft 43 and a rotation transmission gear (not shown) is provided at the shaft end of the rotary shaft 43. This rotation transmission gear is rotated through a reduction gear mechanism by a motor serving as a driving source, though not shown.

According to the operation of the tilt mechanism thus arranged, the motor is rotated in response to a signal from the tilt detection unit 40 to rotate the rotary shaft 43 via the reduction gear mechanism and the rotation transmission gear both of which are not shown. The rear surface of the lower chassis 4 is pushed up by the cam 44 which is rotated at the same time when the rotary shaft 43 is rotated. Thus, the lower chassis 4 is skewed upwardly about the support shaft 9, whereby the upper chassis 5, which is operated in unison with the lower chassis 4 via the shaft pin 7, is also skewed similarly upwardly about the support shaft 18 of the base plate 17. Therefore, the skew angle of the optical pickup 37 relative to the disc D is adjusted.

On the other hand, there is provided a carriage 49 of an automotive type which operates to move the optical pickup 37 in the inner and outer directions of the disc D. The carriage 49 is translated together with the optical pickup 37 in the inner and outer directions of the disc D by a rotating driving force of a pinion 52 which is meshed with racks 50, 51 provided on the respective side portions of the lower chassis 4 and the upper chassis 5 in parallel to the guide shafts 32, 33 thereof. The pickup support member 38 is supported to the carriage 49 such that it becomes rotatable about a support shaft 53 extended through the pinion 52 that is disposed in the translating direction of the carriage 49, i.e., in the direction perpendicular to the racks 50, 51. A rotatable range of the pickup support member 38 is set in a range of 180 degrees wherein the optical pickup 37 is opposed to the lower recording surface of the disc D and opposed to the upper recording surface of the disc D.

A drive mechanism for driving the above carriage 49 is constructed as follows. That is, a motor 55 serving as a driving source is supported to the carriage 49 and the aforesaid pinion 52 is rotated by the motor 55 through a reduction gear (not shown). Accordingly, when the pinion 52 is rotated by the motor 55, the pickup support member 38, which is translated along the rack 50 or 51 in the inner and outer directions of the disc D, is guided by the guide shaft 32 or 33. Also, an engagement member 59 provided on the pickup support member 38 is brought in engagement with guide plates 60, 61 which are provided on the lower and upper chassis 4, 5 at their sides opposing the racks 50, 51, thereby stably translating the pickup support member 38.

The racks 50, 51 which are meshed with the pinion 52 of the carriage 49 to translate the optical pickup 37 are constructed as follows.

The rack 50 is provided on the lower chassis 4 such that an end portion thereof in the turntable 26 side is supported by a screw 62 to the side portion of the lower chassis 4 so as to become movable by a very small amount in the upper and lower direction and that the other end of the rack 50 is supported to the side portion of the lower chassis 4 by a set-screw 63 so as to become swingable in the upper and lower direction. The rack 50 is upwardly spring-biased at its thick portions 50a, 50b, which are provided at the front and rear portions of the lower side thereof, by means of leaf springs 64a, 64b held on the bottom surface of the lower chassis 4. In addition, the rack 50 is prevented from escaping downwardly by a stopper plate 65 that serves as a restricting member supported to the lower chassis 4 near the turntable 26.

Therefore, the rack 50 can be seesawed about the stopper plate 65. Although the pinion 52 and the rack 50 are released from being meshed with each other by pushing down the rack 50 on the set-screw 63 side, for example, by hand, the pinion 52 remains meshed with the rack 50 at the portion which is located on the stopper plate 65.

The rack 51 is provided on the upper chassis 5 such that the respective ends thereof are supported to the side portion of the upper chassis 5 by means of set-screws 66a, 66b so as to become movable in the upper and lower directions. The rack 51 is downwardly spring-biased at is thick portions 51a, 51b, which are provided at the front and rear portions thereof, by leaf springs 67a, 67b held on the upper chassis 5.

Accordingly, when the rack 50 is pushed down at the position distant from the turntable 26 against a spring force of the leaf spring 64a, then the rack 50 is swung about the stopper plate 65 and released from being meshed with the pinion 52. Thus, the carriage 49 can be freely moved in a manual fashion in the upper and lower direction together with the pickup support member 38 at its rear side of the stopper plate 65 of the rack 50, i.e., from at its portion approaching the stationary support plate 19.

The rack 50 is restricted from being swung near the turntable 26 by means of the stopper plate 65 so that, even if any pressing force is applied to the rack 50 in the case such as when the disc player is transported, then the pinion 52 can be prevented from being released from meshed with the rack 50 on the turntable 26 side, thereby preventing the carriage 49 from being inadvertently moved by an extraneous force. Therefore, if the carriage 49 is located near the turntable 26, i.e., the stopper plate 65 when the disc player is transported, then the carriage 49 can be kept in engagement without using engagement devices such as transportation screws or the like, thereby preventing the optical pickup 37 and the disc D from being damaged.

When the carriage 49 is in engagement, the guide shaft 32 that guides the pickup support member 38 is supported to the lower chassis 4 near the turntable 26 by the position restricting support member 36 so that the pickup support member 38 is held at the correct position near the turntable 26, ensuring that the pinion 52 is meshed with the rack 50. Thus, the carriage 49 can be brought in engagement reliably.

Further, since the rack 50 is moved together with the turntable 26 at the transport side in the upper and lower direction, engagement apertures 73, 74 can be smoothly fitted into engagement pins 71, 72 when the carriage 49 is moved to a pickup elevating mechanism 68 which will be described below.

The pickup feeding mechanism 1 according to this embodiment includes the pickup elevating mechanism 68 which operates to elevate the optical pickup 37 between the lower chassis 4 and the upper chassis 5 together with the carriage 49.

More specifically, as shown in FIGS. 1 and 2, an elevating guide shaft 69 is perpendicularly elongated along the rear chassis 6 erected from the lower chassis 4 such that the lower end thereof is supported to the lower chassis 4 and the upper end thereof is supported to a flange 6a formed on the rear chassis 6, respectively. An elevating member 70 is supported to the elevation guide shaft 69 so that it can be elevated. Upper and lower engagement pins 71, 72 are horizontally projected from the elevating member 70 in the same direction as the axial direction of the guide shaft 32, whereas the engagement recess 73 and the engagement aperture 74 are formed on the carriage 49 to align with the engagement pins 71, 72 in the horizontal direction. The engagement recess 73 and the engagement aperture 74 receive and engage the engagement pins 71, 72, respectively whereby the carriage 49 is supported to the elevating member 70. Thus, the carriage 49 can be elevated in a straight line fashion.

A rack portion 75 is vertically formed on the side edge of the elevating member 70. A drive gear 76 that is supported to the rear chassis 6 is meshed with the rack portion 75 and a worm gear provided on an output shaft of a motor 77 that is similarly fixed to the rear chassis 6 is meshed with the drive gear 76. Accordingly, the elevating member 70 is moved along the elevation guide shaft 69 through the drive gear 76 by the rotation of the motor 77, whereby the carriage 49 is elevated between the lower chassis 4 and the upper chassis 5.

Further, the pickup feeding mechanism 1 according to this embodiment includes an inverting mechanism 79 which inverts the attitude of the optical pickup 37 in association with both surfaces of the disc D while the carriage 49 is in elevation.

This inverting mechanism 79 is constructed as follows. That is, an inverting gear 80 that is rotated in unison with the aforementioned pickup supporting member 38 is attached to an outer end of the support shaft 53 which is extended through the pinion 52 of the carriage 49. An inverting rack 81 is disposed at an intermediate portion between the lower position and the upper position of the carriage 49 in response to the inverting gear 80. The inverting rack 81 is attached to a support frame 82 which is fixedly erected from the lower chassis 4 that is skewed. A pin 83 is projected from the side surface of the inverting gear 80, and a spring 85 is extended between the pin 83 and a projection member 84 elongated from the carriage 49. By a spring force of the spring 85, the pickup support member 38 is spring-biased so that the optical pickup 37 is reliably held in the looking up direction and in the looking down direction at the lower and upper positions of the carriage 49.

Various signals are input to and output from the optical pickup 37 which is moved in the inner and outer diametrical directions of the disc D along the guide shafts 32, 33 of the lower and upper chassis 4, 5 by means of a flexible wiring film 86. The flexible wiring film 86 is made by forming a conductive foil on a resilient and flexible resin film by some suitable process, such as a printing or the like. One terminal of the flexible wiring film 86 is electrically connected to the pickup support member 38 and the other terminal thereof is electrically connected to a connector 87a of a printed circuit board 87 attached to the base plate 17 that supports the upper chassis 5. The flexible wiring film 86 thus connected is engaged at its intermediate portion with a guide rod 89 horizontally provided on a frame 88 erected from the skewed lower chassis 4 in the outside of the disc D so that the flexible wiring film 86 is escaped so as not to contact with the disc D. Bend portions 86a, 86b that are inclined toward the disc D side are formed on one end and the other end of the flexible wiring film 86. Further, a resilient support member 90 which supports the flexible wiring film 86 is substantially horizontally elongated from the base plate 17 in association with the printed circuit board 87.

Thus, when the pickup support member 38 is moved, although the flexible wiring film 86, which is connected to the pickup support member 38, led to the outside and connected to the printed circuit board 87 mounted on the base plate 17, is guided by the guide rod 89 and horizontally implanted on the frame 88 such that the flexible wiring film 86 is prevented from being curved and extended toward the optical pickup 37 side. Thus, the flexible wiring film 86 can be prevented from troubling the reproduction and movement of the optical pickup 37. In particular, since the bent portions 86a, 86b, which are inclined toward the front surface side, i.e., the turntable 26 side, are formed on one end and the other end of the flexible wiring film 86, the intermediate portion of the flexible wiring film 86 can be prevented from being expanded toward the front surface side. Further, this flexible wiring film 86 is supported by a resilient support member 90 in the base plate 17 side so that it can be prevented from being overhung excessively.

A series of operations of the pickup feeding mechanism in the disc player thus arranged will be described.

FIG. 2 of the accompanying drawings shows the state that the side A of the disc D is being reproduced. In this embodiment, the lower recording surface of the disc D is referred to as a side A and the upper recording surface thereof is referred to as a side B in the description which follows.

When the side A of the disc D is reproduced, the carriage 49 is moved along the lower chassis 4 and the optical pickup 37 is oriented upwardly so as to oppose the side A of the disc D. Also, the guide aperture 39 of the pickup support member 38 is engaged with the guide shaft 32 and the engagement member 59 is engaged with the guide plate 60, whereby the optical pickup support member 38 is brought in the slidable condition. Further, the pickup elevating mechanism 68 is located at the lower position in the standby mode.

Under this condition, the disc D which is held by the turntable 26 and the chucking device 29 is rotated and the pinion 52 is rotated while it is being moved along the rack 50 by the rotation of the motor 55 to move the carriage 49 from the inner peripheral side of the disc D to the outer peripheral side thereof and the optical pickup 37 reads the signal, whereby the side A of the disc D is reproduced. Then, when the reproduction of the side A of the disc D is finished, the carriage 49 is moved in the outer peripheral direction of the disc D, whereafter the guide aperture 39 of the pickup support member 38 is released from the guide shaft 32. Further, immediately before the engagement member 59 is disengaged from the guide plate 60, the engagement recess 73 and the engagement aperture 74 of the carriage 49 are inserted into the engagement pins 71, 72 of the elevating member 70, whereby the optical pickup 37 is supported to the elevating member 70 at the position distant from the outer circumference of the disc D together with the carriage 49 (see FIGS. 1 and 8A).

When the optical pickup 37 is supported on the elevating member 70 together with the carriage 49, the motor 55 that has moved the pinion 52 along the rack 50 is stopped and instead, the motor 77 of the pickup elevating mechanism 68 is rotated. More specifically, the worm 78 and the drive gear 76 are rotated by the rotation of the motor 77 thereby to move the elevating member 70 along the elevating guide shaft 69 in the upper direction by means of the rack portion 75 which is meshed with the drive gear 76. Accordingly, the optical pickup 37 is lifted toward the upper chassis 5 side together with the carriage 49.

Then, the optical pickup 37 is inverted by the inverting mechanism 79 while the carriage 49 is being moved upwardly. That is, when the carriage 49 is lifted from the lower position to the upper position by the elevating member 70, the inverting gear 80 provided at the carriage 49 is meshed with the inverting rack 81, resulting in the inverting gear 80 thus lifted being urged to rotate relative to the inverting rack 81 fixed to the supporting frame 82 (see FIG. 8B). By the rotation of the inverting gear 80, the optical pickup 37 is inverted in an angular range of 180 degrees wherein the attitude of the optical pickup 37 is changed from the looking up state opposing the side A of the disc D to the looking down state opposing the side B of the disc D together with the pickup support member 38 directly coupled to the shaft 53 (see FIGS. 3 and 8C).

When the carriage 49 is lifted up to the upper chassis 5 and the optical pickup 37 is inverted as described above, the motor 77 of the elevating mechanism 68 is stopped. At that time, the pinion 52 of the carriage 49 is meshed with the rack 51 of the upper chassis 5. Thus, when the motor 55 that drives the pinion 52 of the carriage 49 is rotated to move the carriage 49 along the upper chassis 5 in the inner peripheral direction of the disc D, then the guide aperture 39 of the pickup support member 38 is engaged with the guide shaft 53 and the engagement member 59 is engaged with the guide plate 61, whereby the optical pickup 37 is translated to the innermost peripheral portion that is the starting porion of the side B of the disc D together with the carriage 49. Consequently, a signal is read out by the optical pickup 37 and the side B of the disc D is reproduced.

After the reproduction of the side B of the disc D is finished, by the reverse operation, the carriage 49 is moved downwardly by the elevating mechanism 68 from the upper chassis 5 to the lower chassis 4. Then, the optical pickup 37 is again inverted by the inverting mechanism 79 and returned to the starting position of the lower chassis 4 in standby mode.

During the time side A of the disc D is being reproduced by the optical pickup 37, as can be seen from FIG. 2, the flexible wiring film 86 coupled to the pickup support member 38 is wound around the outside of the guide rod 89 disposed outside the outer circumference of the disc D and then connected to the printed circuit board 87 attached on the upper chassis 5. Therefore, the flexible wiring film 86 can be prevented from contacting with the disc D during the optical pickup 37 is being moved.

According to the pickup feeding mechanism of the disc player in the present invention, after the reproduction of one side of the disc D by the optical pickup 37 is finished, the optical pickup 37 is linearly elevated between the lower chassis 4 and the upper chassis 5 by the pickup elevating mechanism 68 together with the carriage 49 and the optical pickup 37 is inverted in attitude by the inverting mechanism 79 during the time it is being elevated, so that the attitude of the optical pickup 37 can be changed from the side A to the side B of the optical disc D readily and reliably.

In the pickup feeding mechanism according to this embodiment, since the inverting shaft of the optical pickup 37, i.e., the supporting shaft 53 that supports the optical pickup 37 to the carriage 49 so that the optical pickup 37 can be inverted in attitude is set in the direction perpendicular to the movement direction of the optical pickup 37, i.e., in the direction perpendicular to the diametrical direction of the disc D, the depth of the disc player body can be reduced.

More specifically, if the supporting shaft 53 is set in the same direction as the direction in which the optical pickup 37 is moved, then the carriage 49 and the inverting mechanism 79 must be disposed into the outside of the rear chassis 6, which causes the depth of the disc player body to be increased. According to this embodiment, since the supporting shaft 53 is set in a direction perpendicular to the direction in which the optical pickup 37 is moved, as is evident from the figures of the drawings, the carriage 49 and the inverting mechanism 79 are disposed at the side of the optical pickup 37, whereby the depth of the disc player body can be reduced, thus making it possible to make the disc player compact in size.

Figure 8A:
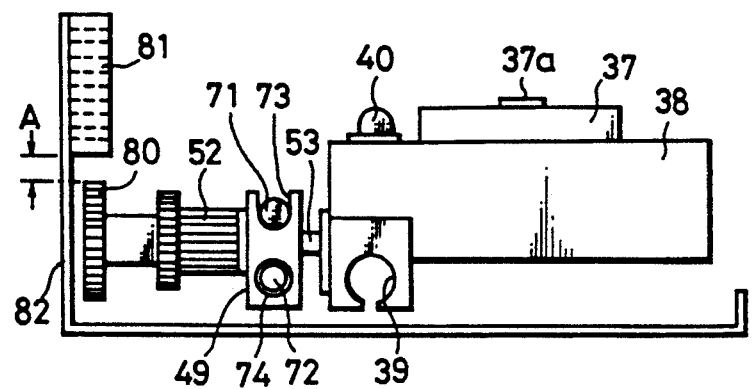
FIGS. 8A through 8C are respectively diagrams used to explain the inverting operation of the optical pick.
Figure 8B:
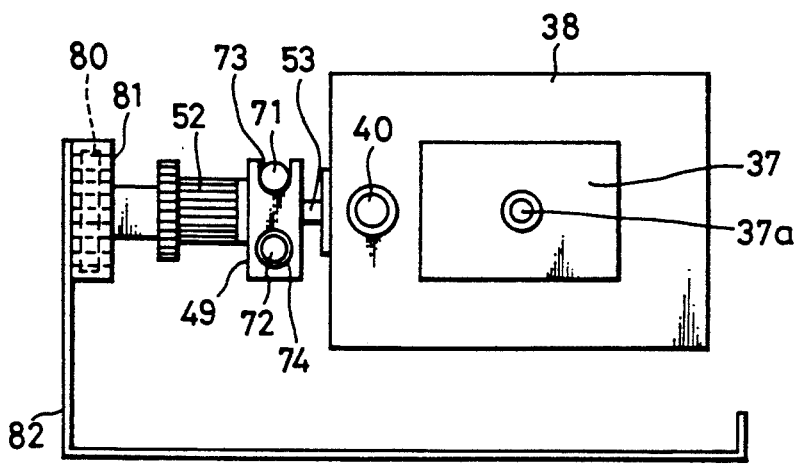
Figure 8C:
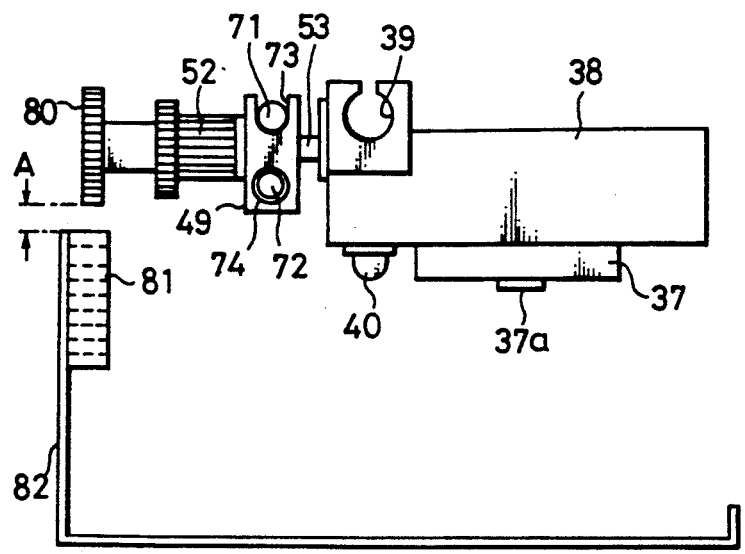

Since the pickup feeding mechanism according to the present invention includes, in particular, the inverting mechanism 79 which comprises the supporting shaft 53 unitarily rotatable with the pickup supporting member 38 and which is extended through the pinion 52 of the carriage 49, the inverting rack 81 attached to the outer end of the supporting shaft 53 and the inverting rack 81, which is meshed with the inverting gear 80 to invert the pickup support member 38 together with the optical pickup 37 while the carriage 49 is in elevation, being attached through the supporting frame 82 to the lower chassis 4 which is skewed, the inverting gear 80 and the inverting rack 81 also are moved in unison with the skewing of the lower chassis 4. Therefore, the inverting gear 80 and the inverting rack 81 can constantly hold a predetermined distance A therebetween regardless of the skew operation of the lower chassis 4 and the upper chassis 5 as shown in FIGS. 8A and 8C. Consequently, the inverting gear 80 and the inverting rack 81 can be prevented from being disengaged from each other or displaced from each other while they are enmeshed with each other. Therefore, the optical pickup 37 can be inverted in attitude accurately and smoothly and also, the optical pickup 37 can be inverted in attitude at high speed.

Further, in the pickup feeding mechanism according to the present invention, since, in particular, the pickup elevating mechanism 68 that elevates the optical pickup 37 is supported to the rear chassis 6 which is formed as one body with the lower chassis 4 that is skewed, the guide shaft 32 and the engagement pins 71, 72 of the elevating mechanism 68 can be constantly located with high accuracy regardless of the skewing movement of the lower chassis 4. Therefore, the optical pickup 37 can be accurately operated following the guide shaft 32 and the engagement pins 71, 72.

Furthermore, since the pickup elevating mechanism 68 employs the special motor 77 to elevate the elevating member 70, the motor 77 becomes operable at high speed. Also, since the optical pickup 37 is elevated linearly, the optical pickup 37 can be elevated and inverted in attitude at high speed.

In addition, if the inverting rack 81 of the inverting mechanism 79 is attached to the upper chassis 5 instead of the lower chassis 4, then a similar action as described above can be achieved.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

We claim:

1. A pickup feeding apparatus for a double-sided reproducing disc player in which a single optical pickup is moved so as to oppose both recording surfaces of a disc on which signals are recorded and reproduces both recording surfaces of the disc loaded onto a turntable, comprising:

(a) an upper chassis and a lower chassis facing to said both recording surfaces of said disc and which are disposed in substantially parallel to a disc surface;

(b) a rear chassis for coupling said upper and lower chassis;

(c) a carriage meshed with first and second racks which are disposed on said upper and lower chassis so as to extend over inner and outer peripheries of said disc, said carriage being transported in the diametrical direction of said disc;

(d) an optical pickup supported on said carriage so that it can be inverted about a shaft disposed in the direction perpendicular to the direction in which said carriage is moved, said optical pickup being moved along first and second guide shafts respectively disposed on said upper and lower chassis in parallel to said first and second racks;

(e) tilt means for adjusting a tilt of said upper and lower chassis in a ganged relation so that said optical pickup is skewed;

(f) pickup elevating means for linearly elevating said carriage together with said optical pickup between said upper and lower chassis along said rear chassis, said pickup elevating means including
an elevating member for holding said optical pickup, said elevating member being coupled through the rear chassis to at least one of said upper and lower chassis skewed by said tilt means,
an elevation motor for elevating said elevating member,
an elevating guide shaft whose lower end is supported from said lower chassis along said rear chassis and whose upper end is supported by said rear chassis and wherein the elevating member is supported by said elevating guide shaft and has parallel engagement pins projected therefrom in the same direction as the axial direction of the first and second guide shafts, and (g) inverting means for inverting said optical pickup while said carriage is being elevated.

2. The pickup feeding apparatus according to claim 1, wherein said pickup elevating means includes an elevating guide shaft whose lower end is supported to said lower chassis along said rear chassis erected from said lower chassis and whose upper end is supported to said rear chassis and an elevating member supported to said elevating guide shaft and having parallel engagement pins projected therefrom in the same direction as the axial directions of the first and second guide shafts.

3. The pickup feeding apparatus according to claim 1, wherein said carriage includes engagement apertures into and with which said engagement pins of said elevating member are inserted and engaged when said carriage is elevated so that said carriage is supported on said elevating member.

4. The pickup feeding apparatus according to claim 1, wherein said upper chassis is swingably supported at its one end side to a base plate which covers said upper chassis from above and includes a first supporting shaft serving as a fulcrum about which said tilt means effects a tilt adjustment, the other end side of said upper chassis being communicated with said lower chassis through said rear chassis.

5. The pickup feeding apparatus according to claim 4, wherein said lower chassis includes an opening portion through which said turntable is projected, said lower chassis being swingably supported by a stationary chassis fixed to a disc player housing in the vicinity of said turntable projected through said opening portion, and said lower chassis having a second supporting shaft serving as a fulcrum about which said tilt means effects the tilt adjustment.

6. The pickup feeding apparatus according to claim 1, wherein said tilt means includes a tilt motor serving as a driving source and a tilt cam provided on a rotary shaft which is rotated by a rotation drive force transmitted thereto via a rotary transmission gear from said tilt motor, said tilt cam being rotated together with said rotary shaft to push up a lower surface of said lower chassis so that said upper and lower chassis are adjusted in tilt in a ganged relation.

7. The pickup feeding apparatus according to claim 1, wherein said carriage includes a pinion meshed with said first and second racks, a pickup support member on which said optical pickup is mounted, said pickup support member disposed in the direction perpendicular to a length direction of said first and second racks and rotatable about a support shaft on which said pinion is rotatably supported, and a pickup drive motor for rotating said pinion to thereby move said pickup supporting member along said first and second racks in the diametrical direction of said disc.

8. The pickup feeding apparatus according to claim 7, further comprising:
first and second supporting shafts for supporting said first and second racks to said upper and lower chassis so that said first and second racks can be swung;
a resilient member for spring-biasing said first and second racks so that said first and second racks are meshed with said pinion provided on said carriage; and
a restricting member disposed at one end side of said second rack for restricting the swing operation of said second rack in the direction in which said second rack is brought in contact with or away from said pinion.

9. The pickup feeding apparatus according to claim 8, wherein said restricting member is disposed in the vicinity of said turntable on which said disc is chucked to become rotatable.

10. A pickup feeding apparatus for a double-sided reproducing disc player in which a single optical pickup is moved so as to oppose both recording surfaces of a disc on which signals are recorded and reproduces both recording surfaces of the disc loaded onto a turntable, comprising:
(a) an upper chassis and a lower chassis facing to said both recording surfaces of said disc and which are disposed substantially parallel to a disc surface;
(b) a rear chassis for coupling said upper and lower chassis;
(c) a carriage meshed with first and second racks which are disposed on said upper and lower chassis so as to extend over inner and outer peripheries of said disc, said carriage being transported in the diametrical direction of said disc;
(d) an optical pickup supported on said carriage so that it can be inverted about a shaft disposed in a direction perpendicular to the direction in which said carriage is moved, said optical pickup being moved along first and second guide shafts respectively disposed on said upper and lower chassis in parallel to said first and second racks;
(e) tilt means for adjusting a tilt of said upper and lower chassis in a ganged relation so that said optical pickup is skewed;
(f) pickup elevating means for linearly elevating said carriage together with said optical pickup between said upper and lower chassis along said rear chassis; and
(g) inverting means for inverting said optical pickup while said carriage is being elevated, wherein said inverting means comprises an inverting gear attached to a supporting shaft on which said optical pickup is supported so as to be inverted, said inverting gear being unitarily rotated with said optical pickup and an inverting rack attached to at least one of said upper and lower chassis skewed by said tilt means, said inverting rack being meshed with said inverting gear to thereby invert said optical pickup.

11. The pickup feeding apparatus according to claim 10, wherein said upper chassis is swingably supported at its one end side to a base plate which covers said upper chassis from above and includes a first supporting shaft serving as a fulcrum about which said tilt means effects a tilt adjustment, the other end side of said upper chassis being coupled with said lower chassis through said rear chassis.

12. The pickup feeding apparatus according to claim 11, wherein said lower chassis includes an opening portion through which said turntable is projected, said lower chassis being swingably supported by a stationary chassis fixed to a disc player housing in the vicinity of said turntable projected into said opening portion, and said lower chassis having a second supporting shaft serving as a fulcrum about which said tilt means effects the tilt adjustment.

13. The pickup feeding apparatus according to claim 10, wherein said tilt means includes a tilt motor serving as a driving source and a tilt cam provided on a rotary shaft which is rotated by a rotation drive force transmitted thereto via a rotary transmission gear from said tilt motor, said tilt cam being rotated together with said rotary shaft to push up a lower surface of said lower chassis so that said upper and lower chassis are adjusted in tilt in a ganged relation.

14. The pickup feeding apparatus according to claim 10, wherein said carriage includes a pinion meshed with said first and second racks, a pickup support member on which said optical pickup is mounted, said pickup support member disposed in the direction perpendicular to a length direction of said first and second racks and rotatable about a support shaft on which said pinion is rotatably supported, and a pickup drive motor for rotating said pinion to thereby move said pickup supporting member along said first and second racks in the diametrical direction of said disc.

15. The pickup feeding apparatus according to claim 14, further comprising:

first and second supporting shafts for supporting said first and second racks to said upper and lower chassis so that said first and second racks can be swung;

a resilient member for spring-biasing said first and second racks so that said first and second racks are meshed with said pinion provided on said carriage; and a restricting member disposed at one end side of said second rack for restricting the swing operation of said second rack in the direction in which said second rack is brought in contact with or away from said pinion.

16. The pickup feeding apparatus according to claim 15, wherein said restricting member is disposed in the vicinity of said turntable on which said disc is chucked to become rotatable.

17. The pickup feeding apparatus according to claim 10, further comprising holding means for restricting the rotation of said inverting gear so that said optical pickup is held in a downward-orienting state and an upward-orienting state at upper and lower positions of said carriage.

18. The pickup feeding apparatus according to claim 10, further comprising a wiring guide member disposed above said upper or lower chassis in the outside of a peripheral edge of said disc and in a direction along which said optical pickup is moved and which exposes a signal input and output flexible wiring member connected to said optical pickup to the outside.

19. The pickup feeding apparatus according to claim 18, wherein said flexible wiring member includes at one and the other side thereof bent portions which are bent toward said disc.

* * * * *